(12) United States Patent
Ahonen

(10) Patent No.: US 7,401,022 B2
(45) Date of Patent: Jul. 15, 2008

(54) PROCESSING A SPEECH FRAME IN A RADIO SYSTEM

(75) Inventor: Petri Ahonen, Jyräskylä (FI)

(73) Assignee: Nokia Corporation, Espoo (FI)

( * ) Notice: Subject to any disclaimer, the term of this patent is extended or adjusted under 35 U.S.C. 154(b) by 536 days.

(21) Appl. No.: 09/954,602

(22) Filed: Sep. 17, 2001

(65) Prior Publication Data
US 2002/0055837 A1    May 9, 2002

(30) Foreign Application Priority Data
Sep. 19, 2000    (FI) ................................ 20002065

(51) Int. Cl.
*G10L 21/00*    (2006.01)
(52) U.S. Cl. ............... 704/270; 704/228; 704/200
(58) Field of Classification Search ............ 704/270.1, 704/226, 233, 246, 210, 208, 214–215, 227–228, 704/500–504, 200, 270, 221; 714/755; 370/252
See application file for complete search history.

(56) References Cited

U.S. PATENT DOCUMENTS

| 5,097,507 | A | | 3/1992 | Zinser et al. ................... 381/31 |
| 5,491,772 | A | | 2/1996 | Hardwick et al. .......... 395/2.35 |
| 5,502,713 | A | * | 3/1996 | Lagerqvist et al. .......... 370/252 |
| 5,572,622 | A | * | 11/1996 | Wigren et al. ................ 704/228 |
| 6,021,385 | A | | 2/2000 | Jarvinen et al. ............. 704/219 |
| 6,092,230 | A | * | 7/2000 | Wood et al. .................. 714/755 |
| 6,233,708 | B1 | | 5/2001 | Hindelang et al. .......... 714/747 |

FOREIGN PATENT DOCUMENTS

| EP | 0798888 A3 | 10/1997 |
| EP | 0805572 A3 | 11/1997 |
| WO | WO 98/38764 | 9/1998 |
| WO | WO 99/46884 | 9/1999 |

OTHER PUBLICATIONS

Dunlop et al., "Digital Mobile Communications and the TETRA System" John Wiley and Sons Limited 1999, ISBN 0-471-98792-1.*

(Continued)

*Primary Examiner*—Huyen X. Vo
(74) *Attorney, Agent, or Firm*—Perman & Green, LLP

(57) ABSTRACT

The invention relates to method of processing a speech frame in radio system, a radio system, a mobile station in radio system, and a network of radio system. In the method a speech frame having propagated over a radio path is channel-decoded. If on the basis of the channel-decoding the speech frame is free of defects, it is inferred from the value of at least one speech parameter in the channel-decoded speech frame whether the speech frame contains speech that is decodable by means of a speech decoder; and if, according to the inference, the speech frame does contain speech that is decodable by means of a speech decoder, the speech frame is decoded by means of a speech decoder; and if, according to the inference, the speech frame does not contain speech that would be decodable by means of the speech decoder, the speech frame is not decoded.

29 Claims, 2 Drawing Sheets

OTHER PUBLICATIONS

Itu, "Series G: Transmission Systems and Media—Digital Transformation Systems—Terminal equipments—Coding of analogous signals by methods other than PMC" G.792, Annex B, 11/96.*

"Digital Mobile Communications and the TETRA System", Dunlop et al., John Wiley & Sons Limited 1999, ISBN 0-471-98792-1.

ETSI (European Telecommunication Standards Institute) specification ETS 300 395-1, May 1997, "Terrestrial Trunked Radio (TETRA); Speech CODEC for Full-Rate Traffic Channel; Part 1: General Description of Speech Functions".

"Speech Coding (Full-Rate)—Mobile Station", SP-4027-420, Aug. 31, 1998 TR 45 TIA/EIA-136-420 Draft Text.

* cited by examiner

PROCESSING A SPEECH FRAME IN A RADIO SYSTEM

FIELD

The invention relates to a method of processing a speech frame in a radio system, a radio system, a mobile station of a radio system, and a network of a radio system.

BACKGROUND

The speech to be transmitted in a radio system is coded in a transmitter by means of a speech coder. An example of a speech coder is the ACELP (Algebraic Code Excited Linear Predictive) coder of the TETRA (Terrestrial Trunked Radio) system. The Tetra system is described in John Dunlop, Demessie Girma, James Irvine: *Digital Mobile Communications and the TETRA System*, John Wiley & Sons Limited 1999, ISBN 0-471-98792-1, incorporated as reference herein. The receiver comprises a speech decoder converting the speech information received back into speech that is understood by humans. If the speech coder itself comprises a speech decoder, the device is called a speech codec.

The digital speech information is channel-coded in a transmitter to prevent the adverse effects caused by the noise on the radio path. Channel codes may be error-detecting and/or error-correcting codes. In principle, the channel codes can be divided into block codes and convolutional codes. Both coding methods can be used simultaneously. One of the block codes is cyclic redundancy check, CRC. Further, convolutional coding and different modifications thereof, such as punctured convolutional coding, are typically used. A typical code rate for convolutional coding, in other words the ratio of the number of user data bits to the coded data bits of a channel, is for example ½ or ⅓. Interleaving is often used in addition to channel coding. In interleaving, the successive bits are mixed with each other for a longer period of time in such a way that a momentary fade on the radio path would not be sufficient to make the radio signal in this period unidentified but that the errors in the signal could still be eliminated by decoding the channel coding.

Information can be not only channel-coded but also encrypted to prevent tapping. Encryption is usually implemented in such a way that an encryption mask is created by means of an encryption algorithm, using certain input parameters, such as an encryption key, the encryption algorithm being connected to the information to be transmitted by means of an XOR operation (a logic exclusive OR operation). Encryption may be performed either prior to or after channel coding. There may be encryption on several levels, for example encryption over a radio interface, and point-to-point encryption for example between two mobile stations. The encryption can be decrypted in the receiver by using the same encryption algorithm that was used in the transmission, as far as the input parameters are also the same.

An error-detecting channel code, for example computation of a cyclic redundancy check, usually expresses the bit errors having entered the channel-coded speech frame on the radio path, whereby a bad frame indication, BFI, is sent to the speech decoder, from which indication the speech decoder detects that it is not advantageous to attempt to decode the speech frame concerned. Thus, the speech decoder generally utilizes a method in which the parameters of the preceding unbroken frame is used, the gain being at the same time attenuated.

However, in some cases, when the bits of a speech frame suitably invert on the radio path, the speech frame no longer contains acceptable data that could be decoded by a speech decoder, although on the basis of the channel code decoding, the speech frame is free of defects. Since there are a very large number of possible bit combinations in a speech frame, for example $2^{137} -1$ different combinations in TETRA, it is in practice impossible to test them all. Thus, attempts to decode a defective speech frame may cause a very strong defective signal to exit from the output of the speech decoder, causing an unpleasant audio shock in the hearer's ears and at worst leading to a hearing defect.

The problem is made worse by the fact that in the TETRA system, for example, the intensity of sound in the loudspeaker of mobile stations is, according to clients' wishes, in the range of the maximum values allowed to maximize the audibility in noisy environments. Thus, even if the loudspeaker circuit has its own restriction of sound intensity, for instance 100 or even 110 decibels, this does not solve the problem. The problem is also made worse by the fact that in many radio systems, when the speech frame is defective, the decoding of the preceding speech frame is repeated by a speech decoder, so that if the preceding speech frame was defective as well, two defective speech frames are decoded successively.

Even if the channel coding could detect the errors, another problem, described in the following, may lead to an audio shock. In radio systems, for example in the GSM system (Global System for Mobile Communication), the encryption is usually decrypted before channel decoding. However, for instance in TETRA the decryption is not performed until after the channel decoding. Hence, the situation may be such that the speech frame containing speech is actually free of defects on the basis of the channel code, too, but for some reason, for example due to incorrect input parameters, the decryption puts the contents of the speech frame that is faultless as such in complete disorder. Although the speech decoder identifies bad speech frames on the basis of the channel code, for example by receiving a bad frame indication from the channel decoder when needed, it will not be able to identify the speech frame that the decryption has put in disorder, because this kind of speech frame does not receive a bad frame indication. Hereby, the speech decoder attempts to decode the speech frame that was put in disorder, causing again, in the worst case, an audio shock. The problem is more likely to arise because of the two-level encryption option in TETRA: radio interface encryption and point-to-point encryption. Users may set up their own encryption modules to perform point-to-point decryption in TETRA mobile stations, and thus the manufacturer of the device has no opportunity to check and test the operation of this kind of encryption module, because the encryption module processes information that is already channel-decoded. From the point of view of the device manufacturer, the encryption module is a black box, a decrypted speech frame coming out of the box in an ideal case. Further, there may be errors in updating encryption keys, if an incorrect encryption key is used as an input parameter of an encryption algorithm.

BRIEF DESCRIPTION

An object of the invention is to provide an improved method, an improved radio system, an improved mobile station for a radio system and an improved network for a radio system. The method according to claim 1 represents one aspect of the invention. The radio system according to claim 12 represents another aspect of the invention. Still another aspect of the invention is represented by the mobile station of a radio system according to claim 23. Yet another aspect of the invention is represented by a radio system network according to claim 24. Other preferred embodiments of the invention are disclosed in the dependent claims.

The invention is based on the idea that even if the speech frame is free of defects on the basis of channel decoding, at least one speech parameter in the channel-decoded speech frame is examined, and on the basis of this examination it is decided whether it is advantageous to attempt to decode the speech frame by means of a speech decoder. Hence, an audio shock is avoided in such a way that the capability of the channel decoding to detect the errors is not blindly relied upon. On the other hand, if the decryption is performed in the system after the channel decoding, studying the parameters in the channel-decoded and decrypted speech frame also prevents a possible audio shock in a situation where the channel-decoded speech frame was free of defects but the decryption put the contents of the speech frame in disorder.

The most significant advantage of the invention is that its utilization allows avoidance of audio shocks in problematic cases described above.

BRIEF DESCRIPTION OF THE DRAWINGS

Preferred embodiments of the invention will now be described by way of example with reference to the attached drawings, of which

DESCRIPTION OF EMBODIMENTS

Figure 1:
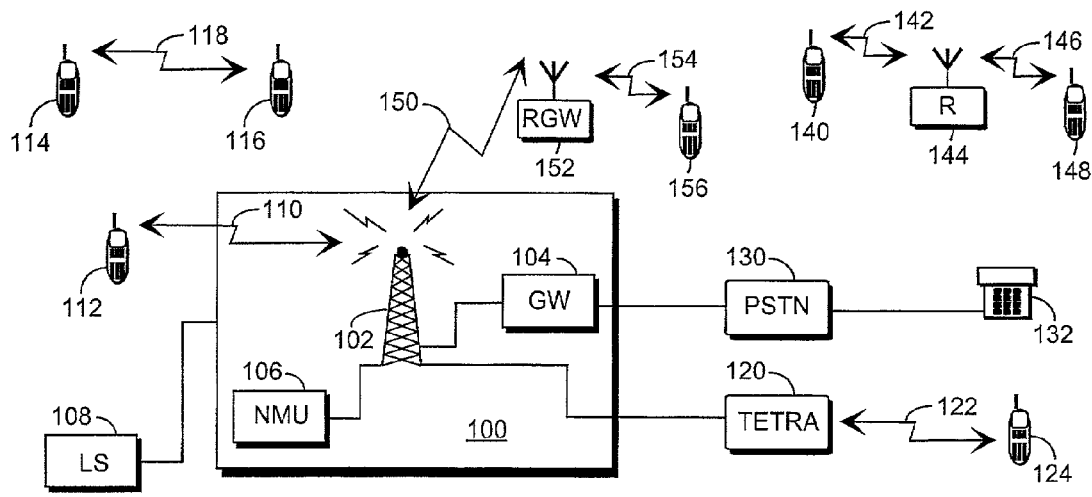
FIG. 1 shows an example of a structure of a radio system.

The structure of a radio system is described with reference to FIG. 1. The system to be described is TETRA, but it is obvious that the embodiments are not limited to this system but may be used in all radio systems that are affected by at least one of the problems mentioned above, i.e. the channel decoding being unideal and/or the decryption functioning inappropriately. The TETRA standard describes six system components and the connections between them. Internal connections of the system components are not defined in the standard in order to allow manufacturers to implement the internal structure of each system component in the most efficient way possible. The system components are as follows: a network 100, a line station 108, a mobile station 112, a direct mode mobile station 114, 116, a gateway 104, and a network management unit 106.

Figure 2:
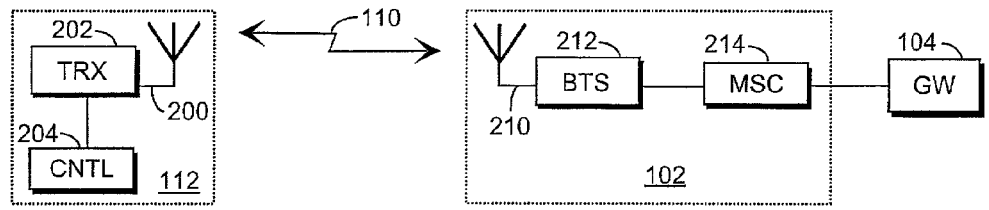
FIG. 2 shows a structure of a radio system network and a radio system mobile station.

The network 100 is a TETRA network system comprising separate network elements, such as a base station 212 with an antenna 210 and a mobile services switching centre 214 shown in FIG. 2. The network 100 roughly corresponds to the GSM base station subsystem and network subsystem combined. This combination is indicated by reference numeral 102 in FIG. 1. The network 100 comprises not only reference numeral 102 but also the network management unit 106 and the gateway 104. As can be seen from FIG. 1, the TETRA network 100 may be connected to a second TETRA network 120, the second TETRA network 120 having a radio connection 122 to a TETRA mobile station 124.

The line station 108 is in practice a terminal or a dispatcher unit in a control room monitoring the TETRA network 100.

The gateway 104 enables calls between users of the TETRA network 100 and users of non-TETRA networks. The definition of the gateway 104 is necessary because other networks to be connected to the TETRA network 100 use incompatible information formats and communication protocols, whereby translations or conversions have to be performed. As an example of a non-TETRA network, FIG. 1 illustrates a public switched telephone network 130 that comprises an ordinary telephone 132, to which a connection can be established from the mobile station 112. Other non-TETRA networks to which a connection can be established via the gateway 104 include ISDN (Integrated Services Digital Network) and a public data network.

By means of the network management unit 106 network management is performed locally and by telecontrol. Network management comprises for example monitoring of errors, system configuration, billing, performance measurement, and planning.

The mobile station 112 enables a radio connection 110 to the network 100. The mobile station 112 can be portable or positioned in a vehicle. The direct mode mobile station 114 enables a radio connection 118 directly to another direct mode mobile station 116 without the network 100 being utilized in any way in implementation of the radio connection 118. The radio connection 118 may be a point-to-point connection or a multipoint connection. An apparatus combining the ordinary mobile station 112 and the direct mode mobile station 114 is also feasible. The ordinary radio connection 110 utilizing the network 100 uses a trunking-mode air interface, whereas the radio connection 118 between two direct mode mobile stations 114, 116 uses a direct-mode air interface.

The connection between two direct mode mobile stations 140, 148 may also be implemented by using an independent radio repeater 144. Thus, a radio connection 142 between the first mobile station 140 and the radio repeater 144 uses a converted direct-mode air interface, as does a radio connection 146 between the second mobile station 148 and the radio repeater 144. Another way to extend the audibility range is to use a gateway radio repeater 152. Thus, a direct mode mobile station 156 uses a converted direct-mode air interface to implement a radio connection 154 with the gateway radio repeater 152. Radio connection 150 of the gateway radio repeater 152 is implemented with the network 100 by using a trunking-mode air interface.

Multiple encryption with different encryption keys and algorithms may be simultaneously used in one call. For example in the connection 110 between the mobile station 112 and the network 100 in FIG. 1, there is radio interface encryption. There is also radio interface encryption in the connection 150 between the network 100 and the gateway radio repeater 152. Further, there is radio interface encryption in the connection 154 between the gateway radio repeater 152 and the direct-mode mobile station 156. Moreover, point-to-point encryption may be used between the mobile station 112 and the direct-mode mobile station 156. In other words, quadruple encryption may be used to implement one call. The situation could be even worse if, for example, there were a connection from the gateway radio repeater 152 to the radio repeater 144 and therefrom a further connection to the direct-mode mobile station 148. In such a case, one call could have fivefold encryption implemented with different encryption masks.

According to FIG. 2, the mobile station 112 comprises an antenna 200, a transmitter-receiver 202 and a control part 204. Other components of the mobile station 112, such as means for implementing the user interface, are not described herein.

TETRA is not presented in more detail herein but reference is made to the work *Digital Mobile Communications and the TETRA System* mentioned at the beginning.

In the following, reference is made to FIG. 3, which illustrates the structure of a radio receiver and a radio transmitter.

Figure 3:
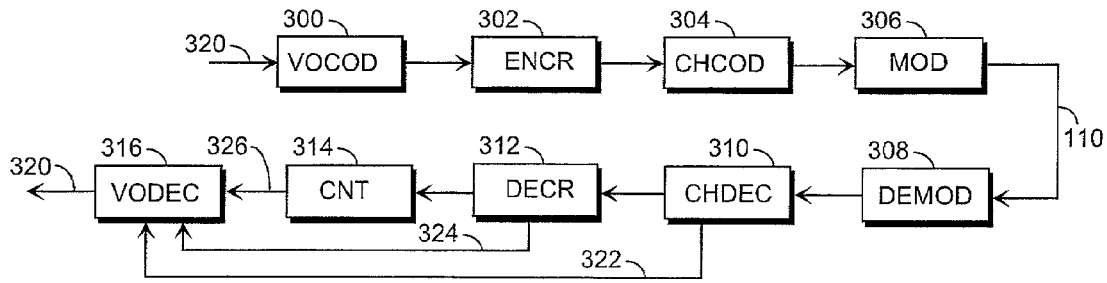
FIG. 3 shows a structure of a radio transmitter and a radio receiver.

A simplified structure of a transmitter is shown at the top of FIG. 3. It is obvious that the transmitter also comprises other functions and structural parts but these are not relevant in this context. Speech 320 is coded by means of a speech coder, such as the ACELP coder mentioned at the beginning, which is described in the above-mentioned work *Digital Mobile Communications and the TETRA System*. The structure of the ACELP codec is described in the ETSI (European Telecommunication Standards Institute) specification ETS 300 395-1, May 1997, *Terrestrial Trunked Radio (TETRA); Speech CODEC for full-rate traffic channel; Part 1: General Description of Speech Functions*, incorporated as reference herein.

Next, the bit stream mapping speech in the form of different parameters, produced by the speech codec, is applied to an encryption-performing block 302, in which the bit stream is encrypted in the way described at the beginning by connecting an encryption mask thereto, which encryption mask has been produced by the encryption algorithm.

Figure 4:
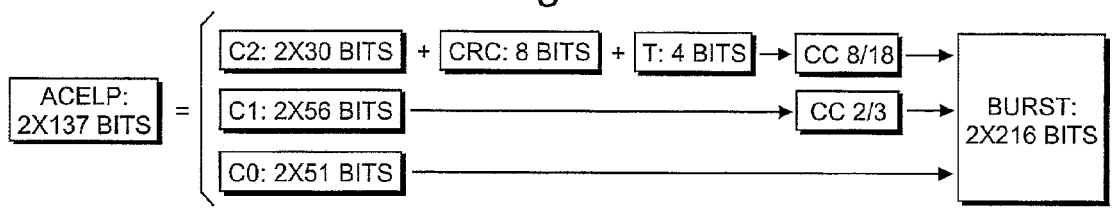
FIG. 4 shows channel coding of speech bits.

The encrypted bit stream is then channel-coded in a channel coder 304; in TETRA, for example, block coding is first performed in the form of CRC, and then convolutional coding. This is shown in greater detail in FIG. 4, which illustrates channel coding of speech bits. The ACELP codec produces 137 bits per each speech part of 30 milliseconds, which corresponds to a bit rate of 4,567 kbit/s. There are two times 137 bits, as two speech frames produced by the ACELP codec are positioned in one burst of the radio interface. The bits of one speech frame are divided into three different categories on the basis of the sensitivity of the bits. The 30 bits that are most sensitive to errors are placed in category 2; 56 bits are placed in category 1; and the 51 bits least sensitive to an error are placed in category 0. A cyclic redundancy check of eight bits and, in addition, four tail bits, are added to the bits of category 2. Thus, category 2 contains 72 bits that are subjected to 8/18 convolutional coding, in other words 18 coded data bits in the channel correspond to each eight data bits, in other words the final number of bits in category 2 is 162 bits. The bits in category 1 are subjected to 2/3 convolutional coding, in other words 112 data bits result in 168 coded data bits in the channel. The bits in category 0 are not protected by channel coding at all, in other words there will be the total of 102 bits of this category in the channel. The total number of bits is thus 162+168+102=432 bits, which is divided in an ordinary burst of the uplink or downlink into two fields of 216 bits.

In the following, the 137 bits produced by the ACELP codec are shown in Table 1. The bits form parameters that are categorized under either a filter or one of the four subframes. The filter parameters are codebook indexes, there being ten of them, LSP1 to LSP10 (LSP=Line Spectrum Pair). Each subframe contains the following parameters: pitch delay, codebook indexes for four different pulses, pulse global sign, pulse shift and a codebook index for gains.

TABLE 1

137 bits produced by the ACELP codec

| Parameter category | Name of parameter | Number of bits |
|---|---|---|
| Filter | Codebook index: LSP1 to LSP3 | 8<br>9 |

TABLE 1-continued 137 bits produced by the ACELP codec

| Parameter category | Name of parameter | Number of bits |
|---|---|---|
|  | Codebook index: LSP4 to LSP6 | 9 |
|  | Codebook index: LSP7 to LSP10 |  |
| Subframe 1 | Pitch delay | 8 |
|  | Codebook index: pulse 4 | 3 |
|  | Codebook index: pulse 3 | 3 |
|  | Codebook index: pulse 2 | 3 |
|  | Codebook index: pulse 1 | 5 |
|  | Pulse global sign | 1 |
|  | Pulse shift | 1 |
|  | Codebook index: gains | 6 |
| Subframe 2 | Pitch delay | 5 |
|  | Codebook index: pulse 4 | 3 |
|  | Codebook index: pulse 3 | 3 |
|  | Codebook index: pulse 2 | 3 |
|  | Codebook index: pulse 1 | 5 |
|  | Pulse global sign | 1 |
|  | Pulse shift | 1 |
|  | Codebook index: gains | 6 |
| Subframe 3 | Pitch delay | 5 |
|  | Codebook index: pulse 4 | 3 |
|  | Codebook index: pulse 3 | 3 |
|  | Codebook index: pulse 2 | 3 |
|  | Codebook index: pulse 1 | 5 |
|  | Pulse global sign | 1 |
|  | Pulse shift | 1 |
|  | Codebook index: gains | 6 |
| Subframe 4 | Pitch delay | 5 |
|  | Codebook index: pulse 4 | 3 |
|  | Codebook index: pulse 3 | 3 |
|  | Codebook index: pulse 2 | 3 |
|  | Codebook index: pulse 1 | 5 |
|  | Pulse global sign | 1 |
|  | Pulse shift | 1 |
|  | Codebook index: gains | 6 |

In the decoding of speech, the parameters shown in Table 1 are decoded and speech is reconstructed by means of a synthesis filter. The most important bits, i.e. the bits in category 2, are located in the following parameters of the speech frame:

Codebook index: LSP1 to LSP3, speech frame bits B1 to B4;

Codebook index: LSP4 to LSP6, speech frame bits B9 to B12;

Codebook index: LSP7 to LSP10, speech frame bits B18 to B21;

Pitch delay for subframe 1, speech frame bits B27 to B32;

Codebook index in each subframe 1 to 4: gains, speech frame bits B51 to B53, B73 to B80, B105 to B107 and B132 to B134.

The encrypted and channel-coded frame is finally sent to a radio path 110 by modulating it in a modulator 306. In TETRA, the multiple access method is TDMA (Time Division Multiple Access), the modulating method being π/4—DQPSK (Differential Quaternary Phase Shift Keying).

Figure 5:
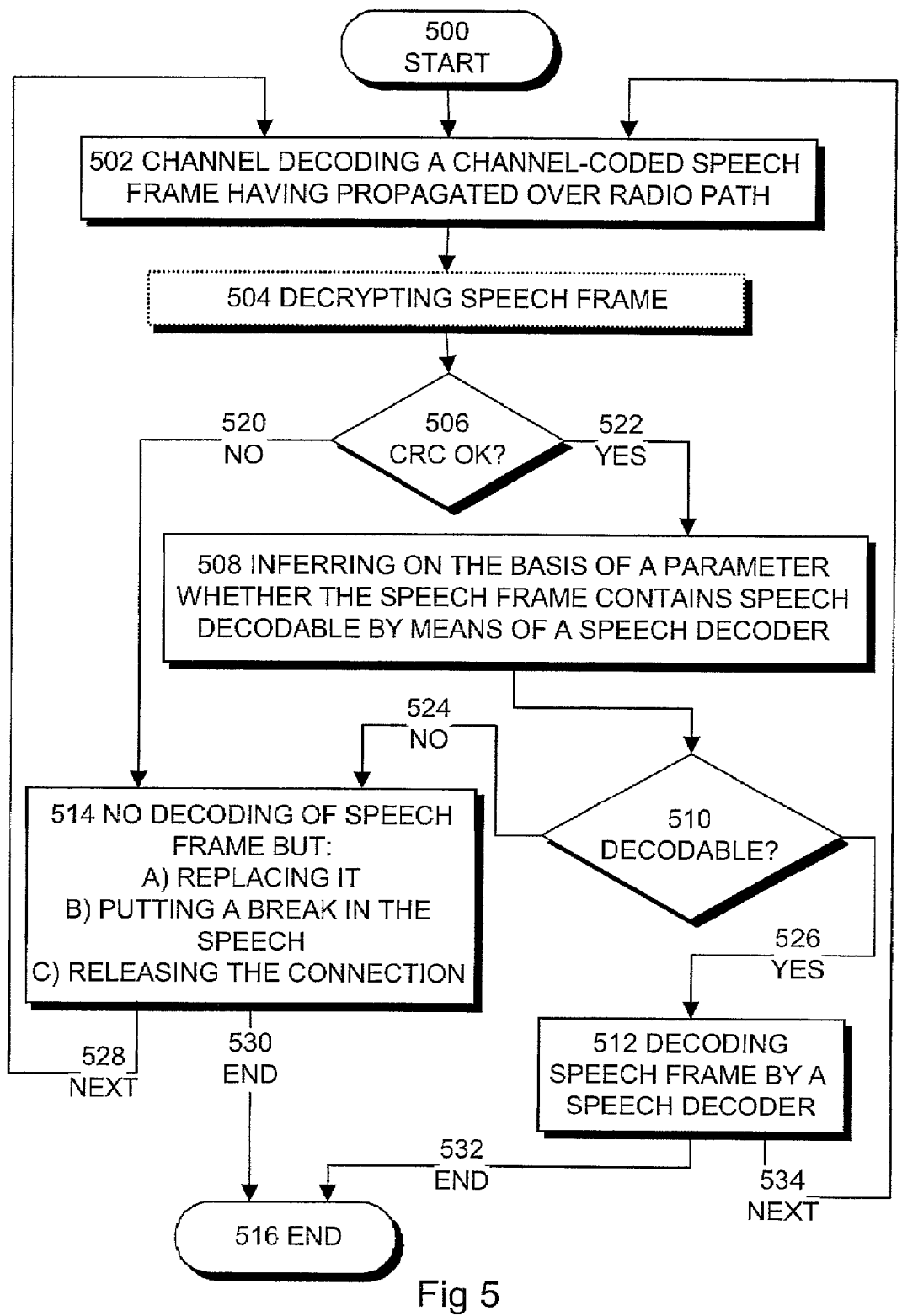
FIG. 5 shows a flow chart illustrating a method of processing a speech frame in a radio system.

A simplified structure of a receiver is illustrated at the bottom of FIG. 3. It is obvious that the receiver also comprises other functions and structural parts, but these are not relevant in this context. In the following, reference is also made to the flow chart of FIG. 5, which illustrates a method of processing a speech frame in a radio system.

The burst received from the radio path 110 is demodulated in a demodulator 308. Channel decoding is then performed in a channel decoder 310, in other words a cyclic redundancy check is computed and the convolutional coding is decoded using a Viterbi decoder, for example. At this point, performance of a method of processing a speech frame in a radio system is actually started. Performance of the method is initiated in a block 500, and in a block 502 the channel-coded speech frame having propagated over the radio path is channel-decoded.

Subsequently, there is an optional decryption block 504 in the method, in which block the encryption of the speech frame, if used, is decrypted.

After this, it is checked in a block 506 whether the speech frame is free of defects on the basis of the channel-decoding. This may be performed, for example, by comparing the computed cyclic redundancy check with the eight-bit cyclic redundancy check received from the channel and contained in the bits of category 2.

If, according to the channel decoding, for example a cyclic redundancy check, the speech frame is defective, the block 506 is followed by a block 514, as indicated by arrow 520. As shown by the block 514, there are no attempts to correct the defective speech frame by means of a speech decoder 316 but:

A) The speech frame may be replaced with a previously received speech frame containing speech free of defects, attenuating thus the gain.

B) A break is put at the point of the speech frame concerned, in other words there is no speech from the loudspeaker of the apparatus for 30 milliseconds.

C) The radio connection 110 can be released if it is too bad, for example if there have been defective frames during a certain period of time, or a certain number of defective frames successively.

If the call terminates, the block 514 is followed by a block 516, as indicated by arrow 530, the performance of the method being terminated in this block. If the call continues, the block 514 is followed by the block 502, as indicated by arrow 528 to process the next received speech frame.

If the speech frame is free of defects on the basis of the channel decoding, the block 506 is followed by a block 508, as indicated by arrow 522. In the block 508, it is inferred from the value of at least one speech parameter in the channel-decoded speech frame whether the speech frame contains speech that is decodable by means of a speech decoder. In TETRA, for example, a speech parameter refers to parameters produced by an ACELP codec, as was shown in Table 1. This inference can be performed as described in U.S. Pat. No. 6,021,385 (Järvinen et al.) by forming a probability distribution for the values of a speech parameter, with the difference that the method is not taken into use based on the quality of the radio link but on the success of the channel decoding. A difference is also that speech frame bits protected by channel coding and most sensitive to errors are used in the inference 508, in other words TETRA also utilizes bits of category 2 in the inference of the block 508. Still another difference in the method of the present application compared with said U.S. patent is that the U.S. patent cannot solve the problems described in this application. The object of U.S. Pat. No. 6,021,385 is to improve the quality of speech decoding, and it utilizes information about the quality of a radio link, for example reception power or bit error ratio.

The result of the inference of the block 508 is checked in a block 510. If, on the basis of the inference, the speech frame does contain speech that is decodable by means of the speech decoder 316, the following step is block 512, in which the speech frame is decoded by the speech decoder 316. If the call terminates, the block 512 is followed by a block 516, as indicated by arrow 532, the implementation of the method being terminated in this block. If the call continues, the block 512 is followed by the block 502, as indicated by arrow 534, to process the next received speech frame. If, according to the inference, the speech frame does not contain speech that would be decodable by means of the speech decoder 316, the next step is the above-described block 514, as indicated by arrow 524, whereby the speech frame is not decoded but one of the replacement measures of block 514 is taken.

The radio system according to FIG. 3 thus comprises also inferring means 314 for inferring from the value of at least one speech parameter in the channel-decoded speech frame whether the speech frame contains speech that is decodable by the speech decoder 316 if the speech frame is free of defects according to the channel decoder 310. Further, the speech decoder 316 is arranged to decode the speech frame if, according to the inference, the speech frame does contain speech that is decodable by the speech decoder 316, and the speech decoder 316 is arranged not to decode the speech frame if, according to the inference, the speech frame does not contain speech that would be decodable by the speech decoder. A potential decryption device 312 is connected between the channel decoder 310 and the inferring means 314, even if in systems other than TETRA the decryption device may be located before the channel decoder 310. From the decryption device 312 the decrypted speech frame is taken to the inferring means 314 and, as indicated by arrow 324, also to the speech decoder 316.

As indicated by arrow 322, the channel decoder 310 sends a bad frame indication to the speech decoder 316 if, on the basis of the channel decoding, the speech frame is defective. In an optimal case, speech 320 that sounds the same as the speech originally sent from the transmitter comes out of the speech decoder 316.

In a preferred embodiment of the invention, the inferring means 314 are arranged to send a bad frame indication 324 to the speech decoder 316 if the speech frame does not, according to the inference, contain speech that would be decodable by means of the speech decoder 316. Another solution that can be used to inform the speech decoder 316 that it is not advantageous to attempt to decode the speech frame is such that the inference means 314 are arranged to send a homing sequence 326 to the speech decoder 316 if, according to the inference, the speech frame does not contain speech that would be decodable by the speech decoder 316. The purpose of the homing sequence is to bring the speech decoder 316 into a known state and thus to enable such an output for the loudspeaker which will not cause an audio shock.

In a preferred embodiment, the inference according to the method in the block 508 is performed in such a way that the inferring means 314 perform the inference by using probability calculation. This is implemented in such a way, for example, that the inferring means 314 calculate in the inference the probability of the value of at least one speech parameter. If the value of a speech parameter is highly improbable in such a situation, it can be assumed that the speech frame does not contain speech. Naturally, the use of two or more parameters for which probability is calculated increases the reliability of the inference. A value may also be calculated for the probability of change in the value of a speech parameter. In such a case, a threshold value has been defined in the inferring means 314 for the probability of change in the value of the parameter to be compared during a given number of speech frames. If the probability of change is lower than the threshold, the inferring means 314 infer that the speech frame does not contain speech that would be decodable by means of the speech decoder 316. To take an example, the pitch of the speaker does not normally change much during a call. If the value of the pitch-mapping parameter changes too much between two successive speech frames, it can be inferred that the speech frame is corrupted either because of disturbance on the radio path and/or erroneous functioning of decryption. Thus, the interest lies not in the parameter value or in the change therein as such but in the probability of the parameter value or the probability of change in the parameter value.

In principle, the point of the probability calculation for parameters is that in reality there is always correlation between the parameter bits. Probability calculation may be used to calculate probabilities between parameters within one speech frame or between some parameters in successive speech frames. Both calculation methods may naturally be used simultaneously to confirm the result, for example by first calculating probabilities between speech frames and then, if a speech frame begins to look corrupted, a probability is calculated for at least one parameter in the speech frame concerned. Comparing successive speech frames requires memory in connection with the inferring means 314, in which memory preceding calculated values or whole speech frames can be stored.

The transmitter/receiver pair according to FIG. 3 may be composed of for example two ordinary TETRA mobile stations 112; two TETRA direct mode mobile stations 114; a mobile station 112 and a network 100; or a network 100 and a mobile station 112. When the connection is between the network 100 and a mobile station, speech may be decoded in the gateway 104 prior to entering a non-TETRA network 130, or in some part of the network 100, such as in a mobile services switching centre 214 prior to entering another TETRA network 120 or a line station 108.

The required functionality may be implemented for example as software in a general-purpose processor, whereby the required functions are implemented as software components. A hardware implementation may also be used, for example as ASIC (Application Specific Integrated Circuit) or as control logic constructed of separate components. Typically, all functions shown in FIG. 3 may be implemented as software. Thus, the inferring means 314 significant for the invention may also be advantageously implemented as software which receives input data from the decryption device 312 and comprises an input connection 326 to the speech decoder 316. Software may be performed for example in the control part 204 of the mobile station 112, and in the network 100 for example in the control part of the mobile services switching centre 214 or the gateway 104.

While the invention is described above with reference to the example according to the attached drawings, it is obvious that the invention is not confined thereto but may be modified in many ways within the inventive idea disclosed in the attached claims.

The invention claimed is:

1. A method of processing a speech frame in a radio system, comprising:
   channel-decoding a speech frame having propagated over a radio path;
   determining whether the speech frame is free of defects on the basis of the channel-decoding;
   if the speech frame is defective on the basis of the channel-decoding, no attempt to correct the defective speech frame is made by a speech decoder;
   if the speech frame is free of defects on the basis of the channel-decoding, determining only from value of at least one speech parameter in the channel-decoded speech frame and not from using channel codes, whether the speech frame contains speech that is decodable by means of a speech decoder;
   if it is determined that the speech frame does contain speech that is decodable by means of a speech decoder, the speech frame is decoded by means of a speech decoder; and
   if, in determining only from value of at least one speech parameter in the channel-decoded speech frame and not from using channel codes whether the speech frame contains speech that is decodable by means of a speech decoder, the speech frame does not contain speech that would be decodable by means of a speech decoder, the speech frame is not decoded.

2. A method according to claim 1, wherein the speech frame is encrypted, whereby decryption of the speech frame is performed in the method.

3. A method according to claim 2, further comprising:
   performing the decryption of the speech frame after the channel-decoding, prior to the inference.

4. A method according to claim 3, wherein if, according to the inference, the speech frame does not contain speech that would be decodable by means of a speech decoder, a bad frame indication is sent to the speech decoder.

5. A method according to claim 3, wherein if, according to the inference, the speech frame does not contain speech that would be decodable by means of a speech decoder, a homing sequence is sent to the speech decoder.

6. A method according to claim 1, wherein the symbols in the speech frame that are protected by channel coding are also used in the inference.

7. A method according to claim 1, wherein determined that the speech frame does not contain speech that would be decodable by means of a speech decoder only from value of at least one speech parameter in the channel-decoded speech frame and not from using channel codes is performed by utilizing probability calculation.

8. A method according to claim 7, wherein in the inference the probability of the value of at least one speech parameter is calculated.

9. A method according to claim 1, wherein in the inference the probability of change in the value of at least one speech parameter is calculated.

10. A method according to claim 9, herein a threshold value has been defined for the probability of change in the value of a parameter during a given number of speech frames.

11. A method according to claim 10, wherein if the probability of change is lower than the threshold value, it is inferred that the speech frame does not contain speech that would be decodable by means of a speech decoder.

12. The method of claim 1 further comprising processing the speech frame in a terrestrial trunked radio system.

13. The method of claim 1 wherein the speech frame is examined to determine a value for the at least one speech parameter in the channel decoded speech frame.

14. An apparatus comprising:
   a channel decoder configured to channel-decode a channel-coded speech frame having propagated over a radio path;
   a speech decoder configured to decode the speech frame; and
   a processor configured to determine whether the speech frame is free of defects on the basis of the channel-decoding, if the speech frame is defective on the basis of the channel-decoding no attempt to correct the defective speech frame by the speech decoder is made, and if the speech frame is free of defects on the basis of the channel decoding, determine only from the value of at least one speech parameter in the channel-decoded speech frame and not from using channel codes whether the speech frame contains speech that is decodable by means of the speech decoder; and
   wherein the speech decoder is configured to decode the speech frame if, according to determining only from value of at least one speech parameter in the channel-decoded speech frame and not from using channel codes, whether the speech frame contains speech that is decodable by means of a speech decoder, the speech frame does contain speech that is decodable by means of the speech decoder; and the speech decoder is arranged not to decode the speech frame if, according to determining only from value of at least one speech parameter in the channel-decoded speech frame and not from using channel codes, whether the speech frame contains speech that is decodable by means of a speech decoder, the speech frame does not contain speech that would be decodable by means of the speech decoder.

15. A radio system according to claim 14, wherein the speech frame is encrypted, whereby the radio system comprises a decryption device for performing decryption of the speech frame.

16. A radio system according to claim 15, wherein the decryption device is connected between the channel decoder and the inferring means.

17. A radio system according to claim 16, wherein the inferring means are arranged to send a bad frame indication to the speech decoder if, according to the inference, the speech frame does not contain speech that would be decodable by means of the speech decoder.

18. A radio system according to claim 16, wherein the inference means are arranged to send a homing sequence to the speech decoder if, according to the inference, the speech frame does not contain speech that would be decodable by means of the speech decoder.

19. A radio system according to claim 14, wherein the inferring means also use in the inference symbols in the speech frame that are protected by channel coding.

20. A radio system according to claim 14, wherein the inferring means perform the inference by utilizing probability calculation.

21. A radio system according to claim 20, wherein the processor is configured to calculate the probability of the value of at least one speech parameter in determining only from the value of the at least one speech parameter in the channel-decoded speech frame and not from using channel codes.

22. A radio system according to claim 14, wherein the processor is configured to calculate the probability of change in the value of at least one speech parameter in the speech frame to be processed in determining only from the value of the at least one speech parameter in the channel-decoded speech frame and not from using channel codes.

23. A radio system according to claim 22, wherein in the inferring means, a threshold value has been defined for the probability of change in the value of a parameter during a given number of speech frames.

24. A radio system according to claim 23, wherein the inferring means infer that the speech frame does not contain speech that would be decodable by means of a speech decoder if the probability of change is lower than the threshold value.

25. The radio system of claim 14 wherein the radio system further comprises a terrestrial trunked radio system.

26. A mobile station in a radio system, comprising:
a channel decoder for channel-decoding a channel-coded speech frame having propagated over a radio path;
a speech decoder for decoding the speech frame; and
a processor configured to determine whether the speech frame is free of defects on the basis of the channel-decoding, if the speech frame is defective on the basis of the channel-decoding no attempt to correct the defective speech frame by the speech decoder is made, and if the speech frame is free of defects on the basis of the channel decoding, determine only from the value of at least one speech parameter in the channel-decoded speech frame and not from using channel codes whether the speech frame contains speech that is decodable by means of the speech decoder; and the speech decoder is configured to decode the speech frame if, according to determining only from value of at least one speech parameter in the channel-decoded speech frame and not from using channel codes, whether the speech frame contains speech that is decodable by means of a speech decoder, the speech frame does contain speech that is decodable by means of the speech decoder; and the speech decoder is arranged not to decode the speech frame if, according to determining only from value of at least one speech parameter in the channel-decoded speech frame and not from using channel codes, whether the speech frame contains speech that is decodable by means of a speech decoder, the speech frame does not contain speech that would be decodable by means of the speech decoder.

27. The mobile station of claim 26 further comprising the radio system comprising a terrestrial trunked radio system.

28. A network of a radio system, comprising:
a channel decoder for channel-decoding a channel-coded speech frame having propagated over a radio path;
a speech decoder for decoding the speech frame; and
a processor configured to determine whether the speech frame is free of defects on the basis of the channel-decoding, if the speech frame is defective on the basis of the channel-decoding no attempt to correct the defective speech frame by the speech decoder is made, and if the speech frame is free of defects on the basis of the channel decoding, determine only from the value of at least one speech parameter in the channel-decoded speech frame and not from using channel codes whether the speech frame contains speech that is decodable by means of the speech decoder; and the speech decoder is configured to decode the speech frame if, according to determining only from value of at least one speech parameter in the channel-decoded speech frame and not from using channel codes, whether the speech frame contains speech that is decodable by means of a speech decoder, the speech frame does contain speech that is decodable by means of the speech decoder; and the speech decoder is arranged not to decode the speech frame if, according to determining only from value of at least one speech parameter in the channel-decoded speech frame and not from using channel codes, whether the speech frame contains speech that is decodable by means of a speech decoder, the speech frame does not contain speech that would be decodable by means of the speech decoder.

29. The network of claim 28 further comprising the radio system being a terrestrial trunked radio system.

* * * * *